United States Patent Office 3,814,808
Patented June 4, 1974

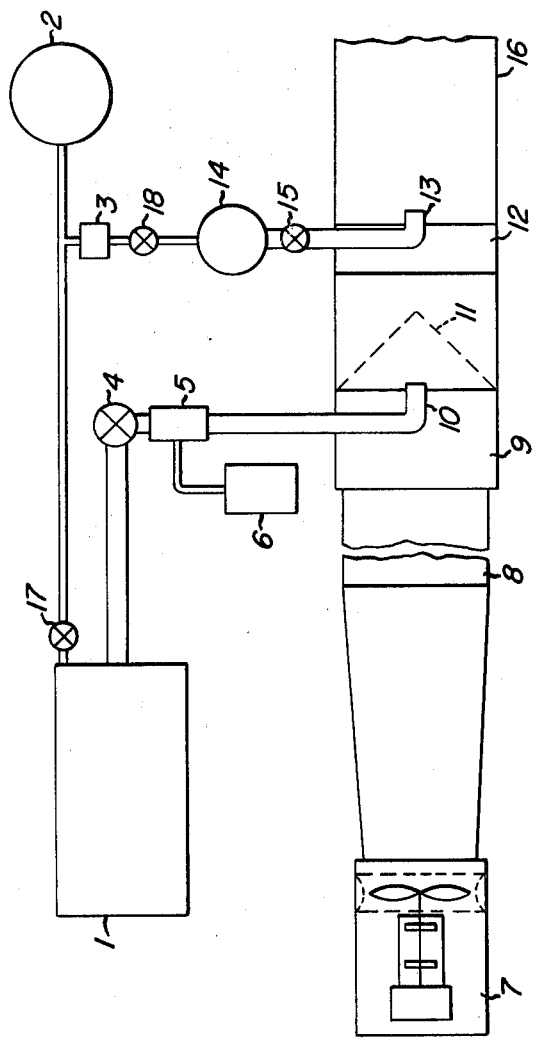

3,814,808
COMPOSITION AND METHOD FOR GENERATING STABILIZED LACRIMATING FOAM FOR TUNNEL DENIAL
James L. Schwendeman and Ival O. Salyer, Dayton, Ohio, assignors to the United States of America as represented by the Secretary of the Army
Filed Oct. 3, 1968, Ser. No. 766,036
Int. Cl. A01n 7/00, 17/06
U.S. Cl. 424—360        14 Claims

ABSTRACT OF THE DISCLOSURE

A chemical composition comprising gelatin, preservative material, crosslinking material, and lacrimating agent to produce a foam by utilizing a system having means to blow the composition into a nozzle and spray the composition against a screen; the foam being used for the denial of access to and use of underground tunnels.

DEDICATORY CLAUSE

The invention described herein may be manufactured, used, and licensed by or for the Government for governmental purposes without the payment to us of any royalty thereon.

SPECIFICATION

Our invention relates to a gelatin foam and the apparatus for dissemination of the foam for use in transporting riot control agents through a tunnel complex and suspending the agents in the tunnel passageways and rooms for at least thirty days.

For several centuries, the Vietnamese people have used underground tunnels, usually of small extent, to hide grain against taxation and for safety during military hostilities. The soil, particularly in the south of Vietnam, is very suitable for tunnel purposes; it being of recent alluvial origin and easy to dig, but it is also of lateritic form and quickly hardens on exposure to oxygen. As the war against the Viet Cong progresses, the tunnels that the enemy is using as hiding places and to give rise to flank and rear attacks and other tactical purposes is causing increasing concern.

The prior art methods and means to deny access to and use of tunnels included blowing smoke or lacrimating agent through the tunnel by means of a blower system, attempting to locate and destroy the tunnels from above ground or by blocking tunnel entrances with explosives, exploration by using dogs, and flooding tunnels with water. All of these methods have proved to be inadequate for reason that the means to disseminate smoke and lacrimating agent was inadequate for a large tunnel system and the smoke or agent did not persist for a sufficient period of time, explosives block only a section of the tunnel, the use of dogs was unsuccessful due to the lack of enthusiasm of either the dog or the handler, and flooding was impractical and did not deny tunnel access for a sufficient period of time. Accordingly, our invention was conceived and reduced to practice to overcome the above prior art problems and disadvantages.

A principal object of our invention is to develop a method and means to rapidly deny access to and use of underground tunnels for periods of at least thirty days and which is capable of being applied in the field by relatively untrained personnel, does not require large amounts of material to be transported into a given area, requires only simple and portable equipment that is easily maintained, and is not hazardous to utilize.

Another object of our invention is to develop a method and means to rapidly deny access to and use of underground tunnels for periods of at least thirty days and which utilizes a foam generated from gelatin having a crosslinking agent added.

A further object of our invention is to develop a method and means to rapidly deny access to and use of underground tunnels for periods of at least thirty days and which utilizes a stabilized gelatin foam employing bacteriostats to reduce micro-organism growth and foam degradation.

Other objects of our invention will be obvious from the specification hereinafter set forth.

The drawing is a schematic diagram of the apparatus that is utilized to disseminate the foam of our invention.

Our invention will now be described in detail as follows.

In order to solve the above problems and disadvantages, it was necessary to develop a gelatin solution that would permit adequate time to add the crosslinking agent to the gelatin and spray it into a foam generator means to avoid gelation taking place prematurely and clogging the foam generator nozzle and screen means.

Our method of making foam utilizes the air entrapment process, and it is necessary to have gelatin solutions with sufficiently low viscosities to permit spraying the gelatin solution under relatively low pressures, 15 to 70 p.s.i. The low viscosity requirement indicates that low molecular weight gelatins should be used. However, if the molecular weight of the gelatin is too low, the gel strength is also low which results in the inability to produce permanent and continuous foams. Cobweb structure foams are the end result of using gelatins of too low molecular weight. Solutions containing large amounts of gelatin should be used, because high gelatin concentration results in more solid gelatin per cubic foot of space for a given expansion factor and a stronger foam. In summary, to be useful in foam production, a gelatin solution should have the highest concentration of high-strength gelatin consistent with maintaining a solution viscosity low enough to permit spraying. To develop the proper viscosity, a number of conventional commercial gelatins in aqueous solution were investigated, and the viscosities of the investigated gelatins were determined as a function of temperature and concentration by measurement with a Brookfield Model LVT viscometer. The results of our investigation are tabulated in Table 1 below.

TABLE 1

| Gelatin | Percent gelatin | Viscosity (cps.) at temperature (° C.) | | | |
|---|---|---|---|---|---|
| | | 55 | 50 | 45 | 40 |
| Sample 1 | 10 | 6.2 | 6.6 | 7.4 | 7.6 |
| | 15 | 10.8 | 13.2 | 13.0 | 14.2 |
| | 20 | 19.0 | 21.2 | 24.2 | 27.8 |
| Sample 2 | 10 | 8 | 14 | 16 | 16 |
| | 15 | 16 | 16 | 16 | 20 |
| | 20 | 24 | 30 | 34 | 42 |
| Sample 3 | 10 | 9.2 | 10.2 | 10.6 | 11.8 |
| | 15 | 18.4 | 20.6 | 23.8 | 26.8 |
| | 20 | 41.8 | 48.4 | 56.0 | 67.2 |
| Sample 4 | 10 | 11.0 | 12.2 | 13.4 | 14.8 |
| | 15 | 26.2 | 30.0 | 34.2 | 40.2 |
| | 20 | 67.6 | 78.4 | 92.2 | 120 |
| Sample 5 | 10 | 12.2 | 13.6 | 14.4 | 16.6 |
| | 15 | 27.8 | 31.8 | 36.0 | 42.2 |
| | 20 | 74.8 | 86.4 | 99.2 | 121.2 |
| Sample 6 | 10 | 14.0 | 15.2 | 16.4 | 18.6 |
| | 15 | 34.8 | 40.0 | 46.0 | 54.0 |
| | 20 | 96.4 | 110.4 | 127.6 | 160.4 |
| Sample 7 | 10 | 14.8 | 16.2 | 17.8 | 20.2 |
| | 15 | 36.2 | 40.8 | 46.6 | 55.4 |
| | 20 | 91.6 | 105.2 | 122.8 | 148.4 |

As can be seen from the tabulated viscosities in Table 1, there is an orderly progression from very low to relatively high viscosity for commercially available gelatin. Spray investigation of the samples in Table 1 showed that Samples 5 and 6 were of sufficiently high molecular weight to produce a permanent and continuous foam and yet low enough to permit spraying with the gelatin solution pH range being within the limits of 3.7 to 4.1 inclusive. In order to improve the properties of Samples 5 and 6 gelatin foams, investigation was conducted to develop an effective crosslinking agent. To be suitable for our invention, the crosslinking agent should be a liquid or soluble in water, must react with gelatin at room temperature, must be capable of reacting with gelatin in a highly dispersed state, and should be easily handled. Of the agents investigated, formaldehyde and glutaraldehyde were found to be effective in producing a stable gelatin foam. The greatest gel strength was produced using 10–20% formaldehyde or 10–20% glutaraldehyde per weight of gelatin in solution. Investigation was further conducted to determine the most effective preservative component to incorporate into our foam producing composition to avoid microbial attack when the foam is introduced into the earth tunnel environment. It was found that a minimum concentration of preservative was necessary to inhibit microbial attack, and the useful preservatives for our foam are tabulated in Table 2 below with the percentage stated being by weight of gelatin in solution. The preservative agent is incorporated merely by dissolving the below tabulated amounts in the gelatin solution.

TABLE 2

Amount of preservative per weight of gelatin in solution

| Preservative | Percent |
| --- | --- |
| Phenol | 2 |
| Pentachlorophenol | 0.05 |
| Ethylbenzyl dimethyl alkyl ammonium cyclohexylsulfamate | 1 |
| Alkyl dimethyl benzyl ammonium saccharinate | 1 |
| Phenyl mercury acetate (30% solution) | 1 |

While all of the above preservatives are suitable for our invention, the pentachlorophenol is the preferred preservative. After it was proven that the above composition of gelatin, crosslinking agent, and preservative produced a foam of acceptable density, homogeneity, and friability, lacrimating agent was incorporated into the gelatin spray either by simple conventional slurrying or merely by dry incorporation. The foam with any conventional lacrimating agent such as CS, incorporated therein in any amount suitable for any given application within the skill of the art is produced and disseminated into tunnels as shown in the drawing and as described as follows. Tank 1 is filled with gelatin and preservative solution, and engine and fan assembly 7 is started in operation; the engine being a two cycle gasoline engine having 8000 r.p.m., a weight of 11 lb., and generating 12.3 brake H.P. Valves 4, 17, and 18 are opened and pressure introduced into the system by tank 2 and regulated at 15 to 70 p.s.i., depending on the gelatin viscosity used, by regulator 3, forces the gelatin-preservative solution through aspirator 5. The velocity of fluid flow through the aspirator causes crosslinking agent contained in tank 6 to be introduced into the aspirator and into the gelatin-preservative solution. The amount of crosslinking agent added is controlled by conventional monitoring means, not shown in the schematic diagram. The solution of gelatin-preservative crosslinking agent enters the foam generating assembly 9 which consists of gelatin nozzle 10 and foam generating screen 11, and the assembly 9 is connected to the engine-fan assembly 7 by means of a flexible duct 8. The air stream from the fan forces the gelatin-preservative-crosslinking solution through nozzle 10 and against screen 11 to generate the foam. The foam is introduced into the lacrimating agent assembly 12, valve 15 is opened, and lacrimating agent is added to the foam by nozzle 13; the lacrimating agent being supplied from tank 14. Foam with agent added is then introduced into the tunnel by means of flexible duct 16. Flexible ducts 8 and 16 are utilized to allow for any bends which may be required in the system in order to introduce the foam into the tunnel.

It is obvious that other modifications can be made of our invention, and we desire to be limited only by the scope of the appended claims.

We claim:

1. A chemical composition to generate foam for tunnel denial comprising gelatin in an amount of 10% to 20%, preservative material selected from the group consisting of phenol, pentachlorophenol, ethylbenzyl dimethyl alkyl ammonium cyclohexylsulfamate, alkyl dimethyl benzyl ammonium saccharinate, and phenyl mercury acetate in an amount of 0.05% to 2% per weight of gelatin, crosslinking agent selected from the group consisting of formaldehyde and glutaraldehyde in an amount of 10% to 20% per weight of gelatin, and lacrimating agent.

2. The composition of claim 1 wherein the composition is in aqueous solution.

3. The composition of claim 2 wherein the gelatin solution has a viscosity ranging from 12.2 to 96.4 cps. at 55° C.

4. The composition of claim 3 wherein the gelatin solution has a pH ranging from 3.7 to 4.1.

5. The composition of claim 1 wherein the phenyl mercury acetate is a 30% solution.

6. The composition of claim 1 wherein the preservative material is pentachlorophenol.

7. The composition of claim 1 wherein the crosslinking agent is formaldehyde.

8. A method of denial of access to and use of underground tunnels by producing and disseminating a foam containing lacrimating agent from the chemical composition of claim 1 comprising the steps of introducing a solution of gelatin and preservative material into a tank means, flowing the gelatin-preservative material solution under pressure to an aspirator means, mixing crosslinking material into the gelatin-preservative material solution at the aspirator means, flowing the gelatin-preservative material-crosslinking material solution to a foam generating assembly, blowing the gelatin-preservative material-crosslinking material solution into a nozzle means by means of an air stream, spraying the gelatin-preservative material-crosslinking material solution from said first nozzle means against a foam generating screen means to produce a foam, flowing the foam to an agent dispersion assembly, adding lacrimating agent to the foam in the agent dispersion assembly, and disseminating the foam containing the lacrimating agent into the tunnel.

9. The method of claim 8 wherein the solution is aqueous.

10. The method of claim 9 wherein the gelatin solution has a viscosity ranging from 12.2 to 96.4 cps. at 55° C.

11. The method of claim 10 wherein the gelatin solution has a pH ranging from 3.7 to 4.1.

12. The method of claim 8 wherein the phenyl mercury acetate is a 30% solution.

13. The method of claim 8 wherein the preservative material is pentachlorophenol.

14. The method of claim 8 wherein the crosslinking material is selected from the group consisting of formaldehyde and glutaraldehyde.

References Cited

UNITED STATES PATENTS 3,467,558   9/1969   Wernette et al. _____ 149—83 X

BENJAMIN R. PADGETT, Primary Examiner

U.S. Cl. X.R.

252—307, 316; 424—14